Figure 1:
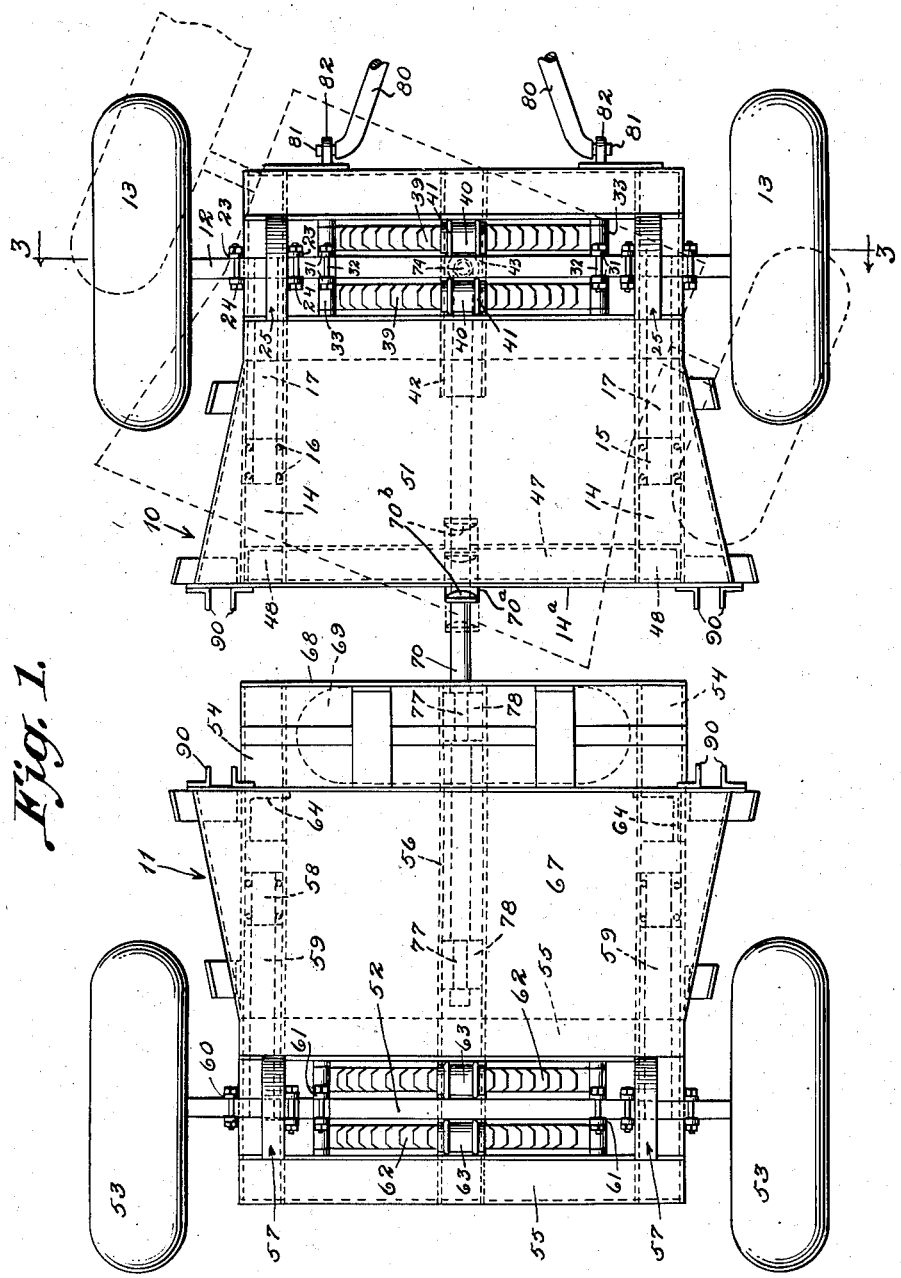

Jan. 8, 1935.  R. A. FONTAINE  1,986,926
BRICK STACK CARRYING TRAILER
Filed July 23, 1930  3 Sheets-Sheet 2
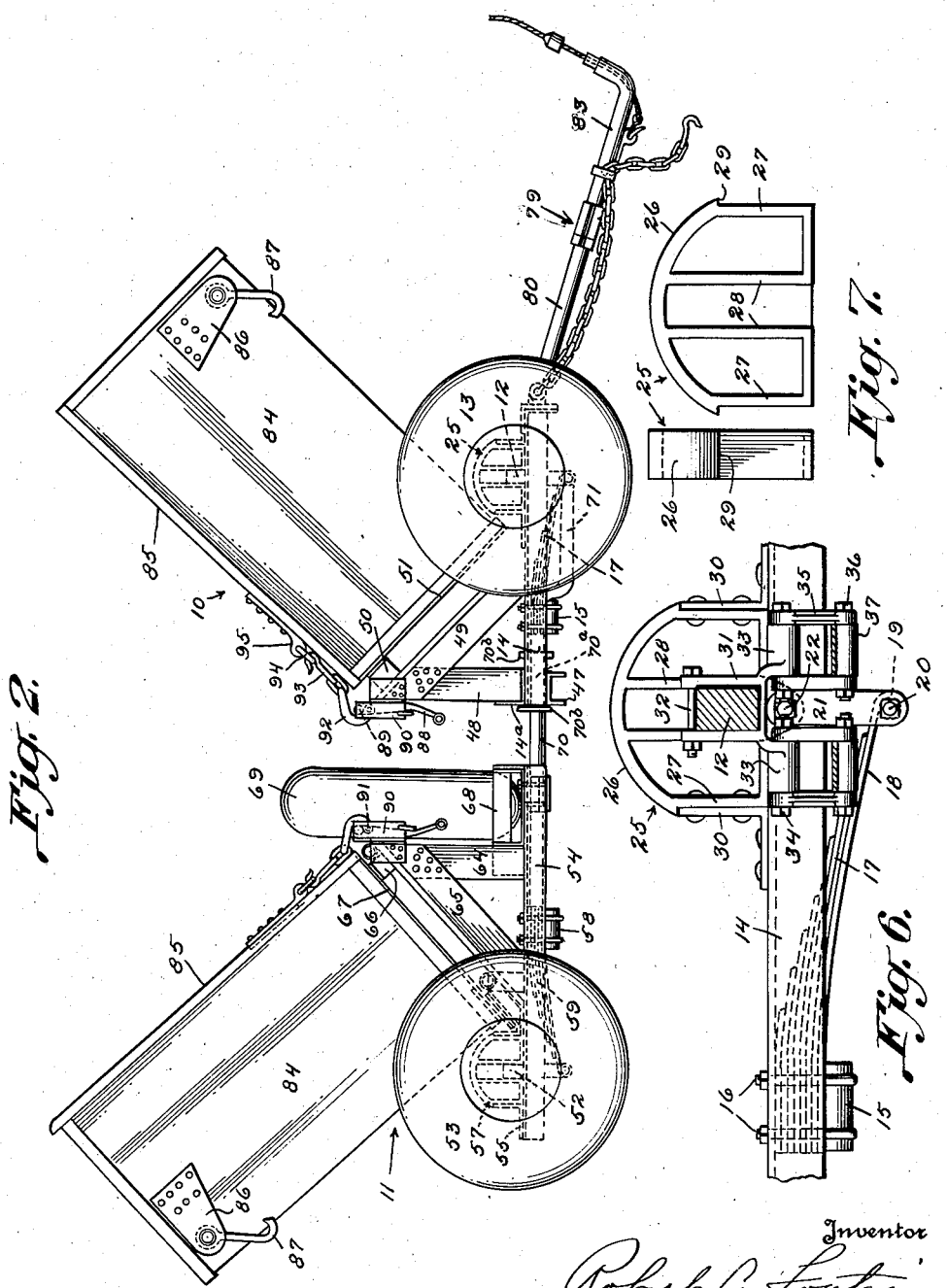

Jan. 8, 1935. R. A. FONTAINE 1,986,926
BRICK STACK CARRYING TRAILER
Filed July 23, 1930  3 Sheets-Sheet 3
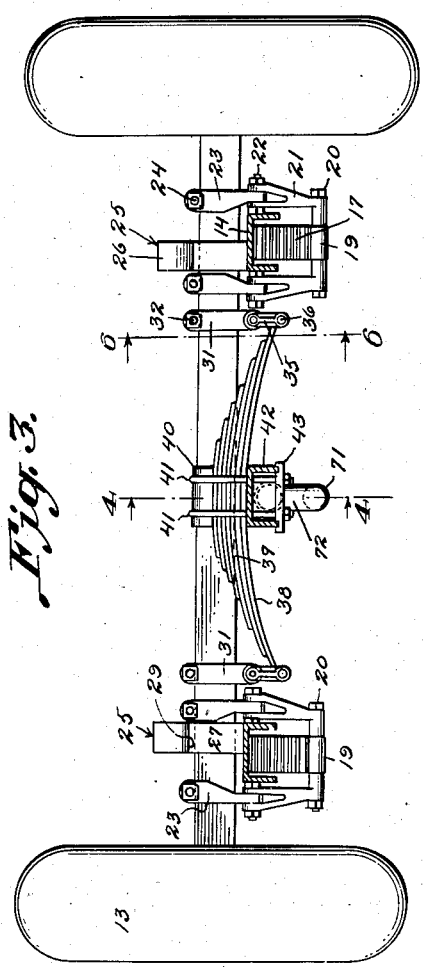

Patented Jan. 8, 1935

1,986,926

UNITED STATES PATENT OFFICE 1,986,926

BRICK STACK CARRYING TRAILER

Robert A. Fontaine, Martinsville, Va.

Application July 28, 1930, Serial No. 471,256

9 Claims. (Cl. 280—33)

The invention relates to industrial trucks particularly trailers, and has for its general object the provision of a novel trailer vehicle or truck adapted to carry a plurality of stacks or hacks of bricks intact.

An important object of the invention is to provide a trailer of such formation as to support a plurality of open-sided bodies or carriers each of which encloses a hack or stack of bricks.

Another object of the invention is to provide a trailer of this type having four wheels and in which the construction is such that the brick carrying body members or enclosures will have their centers of gravity located substantially above the axles of the wheels so that the structure may be light inasmuch as the major portion of the weight is borne directly upon the axles and communicated thereby to the wheels instead of cantilever strains being brought upon any of the parts.

Another object of the invention is to provide a trailer structure in which means is provided for positively securing the brick carrying and enclosing bodies in such manner that they cannot be upset during transportation even over rough roads, this means being, however, readily releasable so that unloading may be effected with the utmost ease.

A further object of the invention is to provide a trailer in which means is provided for supporting stack carrying and enclosing bodies at least substantially similar to the type disclosed in my co-pending application for Shiftable body trucks, filed September 25, 1929, Serial No. 395,170.

A very important object of the invention is to provide a trailer structure in which that portion actually carried by the front wheels may have free torsional movement with respect to the portion mounted upon the rear wheels so as to permit torquing or twisting which is inevitable upon passage over any roads other than dead smooth without racking the parts.

Another object of the invention is to provide a trailer structure in which the front axle and parts or weight supported thereby may move absolutely freely with respect to the rear axle and its load without interference so that short turns may be easily made, this being of particular advantage in and about brick plants or other places where the area is limited.

A more specific object is to provide a vehicle of this character in which there is a novel single connection between the front and rear axles, this single connection permitting the necessary relative movements of the parts whose weight is supported upon these respective axles.

Another specific object is to provide a novel spring suspension embodying a combination of longitudinal and transverse springs combined with an underslung construction whereby jolting and jarring even under the most adverse road conditions will be reduced to the minimum and displacement of the stack or damage to the individual bricks therein prevented.

An additional object is to provide a trailer structure which may, if desired, be provided with a tongue structure having novel means for connection with a towing vehicle as disclosed in my co-pending application for patent for Truck and trailer coupling mechanism filed of even date herewith.

A final object of the invention is to provide a device of this character which will be simple and inexpensive to make, easy to load and unload, couple or uncouple, efficient in operation, durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a plan view of a trailer constructed in accordance with my invention, the straight-ahead position being indicated by full lines and a turning position being indicated by dotted lines, Figure 2 is a side elevation, Figure 3 is a vertical cross sectional view taken on the line 3—3 of Figure 1, Figure 4 is a longitudinal section taken on the line 4—4 of Figure 3, Figure 5 is a detail plan view of the parts, disassembled, for connecting the forward end of the reach rod with the front axle assembly, Figure 6 is a longitudinal sectional view taken on the line 6—6 of Figure 3, Figure 7 is a view showing the end and the side of the bridge member at each end of each axle.

Referring more particularly to the drawings I have shown the truck as comprising, broadly, forward and rear sections indicated as a whole by the numerals 10 and 11. The construction of both the front and rear sections or parts is identical in most respects but for the sake of clearness a differentiation will be made. The front section 10 comprises the front axle 12 which is of course dirigible and equipped with wheels 13, preferably tired in accordance with modern practice, and also spaced parallel longitudinally extending inverted channel bars 14 connected by any desired number of transverse angle bars 14ª or the like. Within the bars 14 are located and secured, by clamps 15 embodying U-bolts 16, longitudinally extending laminated cantilever springs 17, the master leaves 18 of which are eyed at their forward ends as shown at 19 and secured as by bolts 20 between shackles 21 suspended by bolts 22 from hangers 23 embracing the front axle 12 and supported therefrom by bolts 24 which engage over the top of the axle. Straddling each end portion of the axle is a bridge member 25 here shown as having a convex top piece 26 and depending outer sides 27 and intermediate vertical portions 28, the latter engaging directly against the sides of the axle. The depending sides 27 are preferably undercut as shown or shouldered as shown at 29 and riveted or otherwise secured thereto are angle braces 30 in turn secured upon the longitudinally extending bars 14. The portions 28 constitute guides between which the axle may move up and down in accordance with the deflection of the cantilever springs 17. Also embracing the axle are hangers 31 connected at their upper ends by bolts 32 and formed at their lower ends with bearings 33 through which pass bolts 34 supporting shackles 35 carrying bolts 36 which pass through eyes 37 on the ends of the master leaves 38 of laminated springs 39 located at opposite sides of the front axle 12 and secured thereto by a clamp 40 and U-bolts 41. This front section also includes a rearwardly extending inverted channel bar 42 beneath the forward end of which is engaged a notched plate 43 through which the U-bolts 41 extend and which is held thereby. This plate 43 has a cylindrical bore 44 therein leading to a rectangular socket 45 which in turn leads to a counterbore 46. The purpose of this plate and the details thereof will be hereinafter explained. It might also be mentioned at this time that there may be other details in this front section, particularly as regards the frame construction thereof, not described with any degree of particularity as they may be varied within considerable limits without departing in any way from the essential features. However, it is a feature that this front member 10 includes a transversely extending channel bar 47 secured to and preferably beneath the side bars 14. There are also provided upright posts 48 suitably secured either to the side bars 14 or to the cross bar 47 and secured at their upper ends to inclined bars 49 which may conveniently be of angular formation in cross section. I have also shown other supporting members 50 extending transversely of the inclined bars 49 and carrying a platform 51.

The rear section 11 comprises an axle 52 which is not dirigible and which carries preferably tired wheels 53. This section also includes side bars 54 connected by transverse bars 55, and also a central longitudinally extending channel bar 56. Bridge members 57 corresponding to the above described bridge members 25 are secured to the side bars 54. Secured within the side bars 54 as by clamps 58 are cantilever springs 59 which have their rear ends connected with shackles 60 carried by the rear axle. This axle also carries other shackles 61 with which are connected the ends of a pair of transverse laminated springs 62 which are in turn connected with the back axle by clamps 63. A minute description of the spring and shackle arrangement is not given as it conforms exactly to what is provided at the front axle.

Similar to the front section, the rear section includes upstanding post members 64 and inclined bars 65 secured thereto and carrying supporting brackets or the like 66 on which is mounted a platform 67.

While it is not essential it is very convenient that the rear section 11 be provided with a suitably constructed rack or cradle 68 within which a spare tire 69 may be carried.

The means for connecting the front and rear sections 10 and 11 is here shown as comprising a cylindrical reach rod 70 which may be solid or tubular and which is provided at its forward end with a downward offset 71 terminating in an upward extension 72 having a neck 73 thereon spaced from the end, there being a head 74 outwardly of this neck or above it. The upstanding portion 72 is located within the bore 44 of the plate 43 and connection of the reach rod with this plate is effected by means of a pair of blocks 75 formed with semi-circular recesses 76 which mate and which fit within the socket 45 in embracing relation to the neck 73. As long as the block members 75 are located within the rectangular socket 45 they are held together and it is obvious that the front end of the reach rod cannot become disconnected from the front section. This reach rod is of sufficient length to extend beneath the major portion of the rear section 11 and beneath this section it is provided with a pair of reduced portions 77 engaged within bearings 78 secured within the channel bar 56. Clearly the front axle structure may rotate about the upstanding forward end 72 of the reach rod, that is to say upon a vertical axis while the rear section 11 may rotate or tilt about a horizontal axis owing to the engagement of the bearings 78 upon the reduced portions 77. This latter mentioned feature is to permit the rear section to twist, cant or rack with respect to the front section in case the bearing points of all four wheels on the ground are not in the same plane. This is necessary to avoid racking and distorting the structure when passing over road inequalities. On the reach rod 70 is a slidable bearing 70ª engaged between the rear bar 14ª and the channel bar 47 and having projections 70ᵇ engageable therewith so as to guide the front section on the reach rod when the front wheels are "cut".

Of course any suitable means may be provided in the nature of a tongue connected with the front section for towing purposes and in actual practice I may make use of a tongue structure indicated as a whole by the numeral 79 and including forwardly converging rods 80 having laterally extending trunnions 81 pivotally engaged within brackets 82 on the front end of the section 10, the forward ends of these rods being connected with an arm 83 adapted to be connected with the towing vehicle. There is no particular limitation in this case as to the tongue structure but it may conveniently be as disclosed in my co-pending application for patent for Truck and trailer coupling mechanism filed of even date herewith.

The bars 49 and 65 and platforms 51 and 67 are shown as inclined in opposite directions and converging upwardly and they constitute seats for a pair of truck bodies 84 which may, if desired, be substantially similar or at least somewhat similar to the body disclosed in my co-pending application for patent for Shiftable body truck, filed September 25, 1929, Serial No. 395,170. Each body is shown as closed on all sides with the exception of the top 85 which is open and these bodies are intended to be filled with bricks in stack or hack form. The reason for supporting them in the inclined position shown is to insure the back of the stack engaging against the closed back or lower part of the body so that disorganization of the stack will be prevented. The bodies are represented as having ears 86 on their sides to which are connected hooks 87 which of course do not function in so far as the present trailer is concerned but which are used when the bodies are mounted on some other type of truck for example such as shown in the above mentioned co-pending application.

When these bodies are resting upon the platforms in the inclined position shown it will be apparent that the center of gravity of the loads will be substantially directly over the respective axles. This feature is of great importance as the axles are capable of standing the strain and it therefore becomes possible to make the other portions of the trailer, notably the reach rod and its associated parts, of very light and cheap construction. When these bodies are in this inclined position it is quite apparent that there is a strong tendency for them to fall over and in order to prevent this I provide the front and rear sections 10 and 11 with levers 88 pivoted as at 89 upon brackets 90 mounted at some convenient location either on the posts 48 and 64 or bars 49 and 65. Pivoted at 91 to these levers are curved arms 92 having connected therewith hooks 93 engageable within rings 94 carried by apertured ear members 95 secured to the edges of the bodies at the open sides thereof. Removable stop pins 96 or the like may be provided for preventing the levers 88 from moving accidentally out of their locking positions past center.

In the use of the trailer, it will be seen that the truck bodies 84 containing the stacks of bricks may be easily placed in position upon the platforms provided for their reception by means of a derrick, crane or other handling device. It is also conceivable that they may be slid off from a truck such as that disclosed in said copending application and deposited onto the platforms. The hooks 93 are then engaged with the links or rings 94 and the levers 88 swung downwardly past center and held by the members 96, the purpose of this structure being to hold the truck bodies firmly against the platforms and prevent them from tipping over as they would unquestionably do especially when travelling over rough roads. Any preferred traction device, truck, tractor or the like, may be connected with the tongue 79 for pulling the trailer. In view of the peculiar construction at the front axle whereby it is directly rotatable about a vertical axis at the center of the front of the trailer it is clear that very short turns may be made, this being of great advantage as it enables the device to be used in limited areas such for example as around a brick plant, warehouse or the like where there is not much free space. Owing to the revolubility of the reach rod with respect to the rear section it is clear that the front and rear axles may cut or tilt laterally with respect to each other without bringing any strains upon the remainder of the apparatus even though the surface traveled over be very uneven.

From the foregoing description and a study of the drawings it will be apparent that I have thus provided a simply constructed and consequently inexpensive trailer by means of which a plurality of stacks of bricks may be readily transported from place to place without danger of disorganizing the stack and, on account of the spring suspension, without any danger of damage to the bricks themselves by way of chipping or cracking. It is obvious that a number of the trailers might be connected in a train all being drawn by a single tractor and in this way transportation costs may be greatly reduced. It is really believed that the construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a trailer, the combination of similar front and rear sections each having an axle carrying ground engaging wheels, the front axle being dirigible, a continuous rigid member connecting the sections and permitting relative canting thereof and pivotal movement of the forward section, said member having an integral upstanding trunnion at its forward end pivotally engaged with the front section at a point beneath the center of the front axle.

2. A trailer comprising front and rear sections each having an axle carrying ground engaging wheels, the axle of the front section being dirigible, and a reach rod connecting the sections, said reach rod having its forward end provided with an upstanding portion, socket means on the forward section beneath the center of the front axle receiving said upstanding portion for pivotal movement on a vertical axis, and bearing members on the rear section rotatably and nonslidably engaging the reach rod for permitting lateral tilting movement of the rear section about a horizontal axis.

3. A trailer comprising front and rear sections each having an axle carrying ground engaging wheels, the axle of the front section being dirigible, and a reach rod connecting the sections, said reach rod having a downwardly offset forward portion terminating in a vertically extending portion having a constricted neck and a head, a bearing member on the front section beneath the center of the front axle receiving said vertical portion and having a socket, and retaining members located within said socket and engaging said constricted neck, said head overlying said retaining members for preventing relative vertical movement, and means for connecting the rear portion of the reach rod with the rear section at a plurality of points.

4. A trailer comprising front and rear sections each having an axle carrying ground engaging wheels, the axle of the front section being dirigible, and a reach rod connecting the sections, said reach rod having a downwardly offset forward portion terminating in a vertically extending portion having a constricted neck and a head, a bearing member on the front section receiving said vertical portion and having a socket, and separable retaining members located within said socket and engaging said constricted neck, said head overlying said retaining members for preventing relative vertical movement, means for connecting the rear portion of the reach rod with the rear section at a plurality of points comprising reduced portions in spaced relation along the reach rod, and bearings on the rear section engaging said reduced portions.

5. A trailer comprising front and rear sections each having an axle carrying ground engaging wheels, vertically spaced members at the rear end of the front section, a tubular bearing member located between said members and slidable longitudinally and transversely thereof, a reach rod mounted on the rear section for rotation about its longitudinal axis, said reach rod extending through said bearing member, and a pivot connection for the forward end of the reach rod with the front section beneath the center of the front axle thereof.

6. A trailer comprising front and rear sections each having an axle carrying ground engaging wheels, the front section being dirigible, bearing members mounted on the rear section, a reach rod mounted within said bearing members for rotation about its longitudinal axis, a pair of guide members on the front section between which said reach rod extends, a tubular member surrounding said reach rod and located between and slidable longitudinally of said guide members, said last named bearing member being slidable longitudinally with respect to the reach rod and transversely with respect to said guide members, the forward end of said reach rod being extended vertically, and a pivotal connection for said forward end beneath the center of the axle of the front section.

7. A trailer comprising front and rear sections each having an axle carrying ground engaging wheels, a reach rod connecting the sections and having its forward end provided with an upstanding trunnion, socket means on the forward section beneath the center of the front axle rotatably receiving said trunnion whereby the front section may pivot about a vertical axis, and means engaging the socket member and the trunnion in transverse relation thereto for preventing vertical movement of the trunnion with respect to the socket member.

8. A trailer comprising front and rear sections each having an axle carrying ground engaging wheels, a reach rod connecting the sections and having its forward end provided with an upstanding trunnion, socket means on the forward section beneath the center of the front axle rotatably receiving said trunnion whereby the front section may pivot about a vertical axis, and means engaging the socket member and the trunnion in transverse relation thereto for preventing vertical movement of the trunnion with respect to the socket member, said means being removable to permit disengagement of the trunnion from the socket member.

9. A trailer comprising front and rear sections each having an axle carrying ground engaging wheels, a reach rod connecting the sections and having its forward end provided with an upstanding trunnion, socket means on the forward section beneath the center of the front axle rotatably receiving said trunnion whereby the front section may pivot about a vertical axis, means engaging the socket member and the trunnion in transverse relation thereto for preventing vertical movement of the trunnion with respect to the socket member, and coacting guide means on the reach rod and the front section for preventing forward or rearward tilting of the front section with respect to the reach rod.

ROBERT A. FONTAINE.